(12) United States Patent
Sirin et al.

(10) Patent No.: US 11,393,609 B2
(45) Date of Patent: Jul. 19, 2022

(54) FLAME RETARDANT, LOW SMOKE, COLD RESISTANT ELECTRIC CABLE

(71) Applicant: PRYSMIAN S.P.A., Milan (IT)

(72) Inventors: Zekeriya Sirin, Milan (IT); Alaettin Senkaya, Milan (IT); Serdar Buyuk, Milan (IT); Ozlem Albayrak, Milan (IT)

(73) Assignee: PRYSMIAN S.P.A., Milan (IT)

( * ) Notice: Subject to any disclaimer, the term of this patent is extended or adjusted under 35 U.S.C. 154(b) by 193 days.

(21) Appl. No.: 16/626,797

(22) PCT Filed: Jun. 29, 2017

(86) PCT No.: PCT/IB2017/053916
§ 371 (c)(1),
(2) Date: Dec. 26, 2019

(87) PCT Pub. No.: WO2019/002917
PCT Pub. Date: Jan. 3, 2019

(65) Prior Publication Data
US 2020/0118710 A1     Apr. 16, 2020

(51) Int. Cl.
| | |
|---|---|
| *H01B 7/295* | (2006.01) |
| *C08K 5/00* | (2006.01) |
| *C09D 127/06* | (2006.01) |
| *H01B 3/44* | (2006.01) |
| *H01B 7/02* | (2006.01) |
| *C08K 3/22* | (2006.01) |

(52) U.S. Cl.
CPC ............ *H01B 7/295* (2013.01); *C08K 5/0016* (2013.01); *C09D 127/06* (2013.01); *H01B 3/443* (2013.01); *H01B 7/0216* (2013.01); *C08K 2003/2224* (2013.01); *C08K 2003/2227* (2013.01)

(58) Field of Classification Search
None
See application file for complete search history.

(56) References Cited

U.S. PATENT DOCUMENTS

| | | | |
|---|---|---|---|
| 2002/0001715 A1 | 1/2002 | Redondo et al. | |
| 2013/0062094 A1 | 3/2013 | Naert et al. | |

FOREIGN PATENT DOCUMENTS

| | | |
|---|---|---|
| CN | 105255047 A | 1/2016 |
| EP | 1 116 244 B1 | 7/2001 |

OTHER PUBLICATIONS

Internationai Search Report and Written Opinion dated Mar. 7, 2018 in PCT/IB2017/053916, 14 pages.

*Primary Examiner* — Robert T Butcher
(74) *Attorney, Agent, or Firm* — Oblon, McClelland, Maier & Neustadt, L.L.P.

(57) ABSTRACT

The present invention concerns an electric cable (10; 20) comprising: —an electric conductor (11, 21) surrounded with an electrically insulating layer (12, 22) made from a first polymer composition comprising: (a) polyvinyl chloride as a first polymer matrix, (b) an amount up to 45 phr of a plasticizing system consisting of a phthalate plasticizer and a second plasticizer selected from: dialkyl-adipate, dialkyl-sebacate or dialkyl-azelate, wherein the alkyl group contains from 4 to 10 carbon atoms; the first polymer composition having a limiting oxygen index (LOI) up to 30%; and—an outer sheath (13, 24), surrounding the insulating layer (12, 22), made from a second polymer composition comprising: (i) a halogen-free second polymer matrix; and (ii) a halogen-free inorganic flame-retardant filler in amount suitable to impart flame retardant properties to the outer sheath (13, 24). The cable of the present invention exhibits flame retardancy, low smoke and cold resistance properties and is particularly suitable for low voltage power transmission or for telecommunications.

16 Claims, 1 Drawing Sheet

FLAME RETARDANT, LOW SMOKE, COLD RESISTANT ELECTRIC CABLE

BACKGROUND OF THE INVENTION

The present invention relates to a flame retardant, low smoke, cold resistant electric cable, in particular for low voltage power transmission or for telecommunications.

Electric cables, in particular for low voltage power transmission or for telecommunications, are normally formed by one or more conductors, each of which is coated with an insulating layer made of a polymeric material; an outer protective sheath made of a polymeric material surrounds the single coated conductor or the coated conductors stranded together.

In the flame retardant cables of the state of the art, the insulating layer is often made of polyvinyl chloride (PVC), a polymer which is inherently resistant to flame due to its high chlorine content. Pure PVC, however, is rather rigid and, to make it suitably flexible for cable manufacturing and deployment, it needs to be added with plasticizers, the more commonly used being phthalates. PVC is also normally added with flame retardant agents (e.g. antimony oxides, magnesium oxides, brominated phthalate esters, chlorinated paraffins, etc.) in order to enhance its flame retardant properties.

The known flame retardant cables containing PVC insulating layers have the drawback of producing significant smoke emissions when exposed to flame. The smoke levels can be particularly high if PVC contains halogenated additives.

Another drawback of PVC insulating layers is their brittleness and fragility at low temperatures (below 0° C.). In order to overcome this drawback, PCV may be added with specific mixture of plasticizers that can impart adequate mechanical properties to the polymer up to temperature of −50° C. However, the plasticizer mixtures suitable for imparting cold resistance to PVC compositions could further increase the smoke emissions upon exposure to flame and/or can reduce the electrical insulating properties of the composition. Moreover, at ambient temperature these plasticizers can be subjected to migration within the polymeric material thus jeopardizing both its mechanical and insulating properties.

WO 2011/113707 relates to PVC compositions with improved low temperature properties (as low as −40° C.) which are especially useful for insulation for cables. It is provided a blend of: i) a dialkyl phthalate in which the alkyl groups contain from 10 to 14 carbon atoms, and ii) a dialkyl adipate in which the alkyl groups contain from 11 to 14 carbon atoms. Typically 20 to 100 parts of the plasticiser formulation are used per 100 parts of polyvinyl chloride. For optimum low temperature properties, the preferred ratio is 2/3 of phthalates to 1/3 of adipates.

CN 105255047 relates to a −50° C. super low temperature resistant polyvinyl chloride cable material. Said material is comprised, inter alia, of: PVC resin, a first plasticizer (e.g. a phthalate), a second plasticizer (epoxy soybean oil), a cold resistant plasticizer (dioctyl adipate and/or dioctyl sebacate), a toughened cold resistant resin (ethylene-acrylic acid-n-butyl-hydroxy ester), a first flame retardant (antimony trioxide) and a second flame retardant (anhydrous zinc borate). In this cable material, not only a cold resistant plasticizer is added, but more importantly a special cold resistant toughened resin is added. This resin helps to toughen the PVC, maintain a good mechanical performance and effectively overcome brittleness of PVC at low temperature.

WO 2014/013284 relates to flame retardant plasticized PVC compositions characterized by reduced smoke density. PVC compounds which need low temperature resistance can be prepared in combination with dioctyladipate (DOA), dioctylazelate (DOZ) or dioctylsebacate (DOS). Aluminium and calcium hypophosphites (alone or in mixtures) are used as flame retardant agents.

WO 2010/013851 relates to a resin composition for coating material of electrical cables that meets functions and characteristics of both a bedding layer and a woven layer. A resin composition comprises: PVC; a plasticizer selected from the group consisting of a phthalate-based plasticizer, fatty acid-based plasticizer and mixtures thereof; a secondary flame-retardant selected from the group consisting of antimony compound, boron-based compound, tin compound and molybdenum compound. Cold resistance of the electrical cable was measured according to IEC 811-1 standard. The cold resistance requirement is −25° C. or less.

GB 1 504 046 relates to vinyl chloride polymeric compositions having good electrical insulation characteristics. The composition comprises from 20 to 100 parts of phthalic, adipic, sebacic and/or azelaic plasticizers.

Non-halogenated polymeric materials, such as polyolefins, added with elevated amounts of inorganic flame retardant fillers, are also used for the production of insulating layers in flame retardant electric cables as disclosed, for example, in WO 2007/049090. These materials, also known as "HFFR" (Halogen Free Flame Retardant) or "LS0H" (Low Smoke Zero Halogen) materials, besides being a valid alternative to the PVC insulations, offer the additional advantage of producing low levels of smoke emissions when exposed to flame.

The technical datasheet of CW1308 Internal Telephone Cable, HFFR or PVC Sheath, Nov. 12, 2014 (B3 International) illustrates cables with a PVC insulation and Halogen Free Flame Retardant (HFFR) outer sheath material complying with IEC 61034 standard.

SUMMARY OF THE INVENTION

The Applicant faced the problem of providing a flame retardant electric cable having an electrically insulating layer made of a PVC composition, which cable providing low levels of smoke emissions when exposed to flame and an adequate mechanical resistance to low temperature, while maintaining an effective electric performance.

The Applicant found an electric cable having a conductor surrounded by an insulating layer made of a PVC composition formulated with a certain mixture of plasticizers, the insulating layer being surrounded by an outer sheath made of a LS0H material. In particular, the Applicant found a PVC composition containing a specific mixture of plasticizers in an amount equal to or lower than 45 phr and a Limiting Oxygen Index (LOI) up to 30%.

The combined use of an outer sheath made from a LS0H material with a an insulating layer made of a PVC resin compensates the limited flame retardant properties of the PVC insulating layer, without however increasing the smoke emissions. With regards to the cold resistance, the PVC insulating layer, thanks to the specific mixture of plasticizers can operate efficiently at a wide temperature range, from the cable operating temperature down to −50° C. or less.

Therefore, according to a first aspect, the present invention relates to an electric cable comprising:

an electric conductor surrounded with an electrically insulating layer made from a first polymer composition comprising:

(a) polyvinyl chloride as a first polymer matrix,
(b) an amount up to 45 phr of a plasticizing system consisting of a phthalate plasticizer and a second plasticizer selected from: dialkyl-adipate, dialkyl-sebacate or dialkyl-azelate, wherein the alkyl group contains from 4 to 10 carbon atoms;

the first polymer composition having a limiting oxygen index up to 30%; and an outer sheath, surrounding the insulating layer, made from a second polymer composition comprising:
  (i) a halogen-free second polymer matrix; and
  (ii) a halogen-free inorganic flame-retardant filler in amount suitable to impart flame retardant properties to the outer sheath.

The cable having the above features and construction can be qualified as flame-retardant cable.

For the purpose of the present description and of the appended claims, by "flame retardant" it is meant the property of a cable having the capacity of maintaining circuit integrity according to IEC 60502-1 (2004) or equivalent thereof.

The cable having the above features and construction can be qualified as low smoke cable.

For the purpose of the present description and of the appended claims, by "low smoke" it is meant the property of a cable having the capacity of emitting low levels of smoke when exposed to a flame according to IEC 61034-2 (2005) or equivalent thereof. According to IEC 61034-2 (2005), it is recommended that a value of 60% light transmittance in a testing chamber is adopted as a minimum for any cable tested.

The cable having the above features and construction can be qualified as cold resistant cable.

For the purpose of the present description and of the appended claims, by "cold resistant" it is meant the property of a cable having suitable mechanical behavior (in term of bending, elongation and impact resistance) at low temperatures according to IEC 60811-504/505/506 (2012) or equivalent thereof.

For the purpose of the present description and of the appended claims, by the term "electric conductor" it is meant an element of elongate shape having an indefinite length made of an electrically conductive material, e.g. copper or aluminium or composite thereof, for the transportation of electrical energy or a signal.

For the purpose of the present description and of the appended claims, by the term "electrically insulating" it is denoted a layer of material having a volume resistivity of at least $1\times10^{13}$ Ω·cm when measured according to IEC 60502-1 (2004) or equivalent thereof.

For the purpose of the present description and of the appended claims, the term of "phr" (acronym of "parts per hundred rubber"), is used to indicate parts by weight of an ingredient per 100 parts by weight of the polymer matrix.

For the purpose of the present description and of the appended claims, the "limiting oxygen index" or LOI is the minimum concentration of oxygen, expressed as a percentage, supporting the combustion of a polymer. Higher values of LOI indicate greater fire retardancy. LOI values are determined by standards, such as ASTM D2863-12 (2012).

For the purpose of the present description and of the appended claims, the words "a" or "an" are employed to describe elements and components of the invention. This is done merely for convenience and to give a general sense of the invention. This description and claims should be read to include one or at least one and the singular also includes the plural unless it is obvious that it is meant otherwise.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The cable of the present invention can be used for power transmission or telecommunications. Preferably, the cable is suitable for transporting low-voltage (LV) electrical current equal to or lower than 1.5 kV.

The electrical cable of the invention can have one or more electric conductors.

Polyvinyl chloride (PVC) is produced by polymerization of the monomer vinyl chloride (VCM). The PVC is a synthetic polymer resulting from the repetitive addition of VMC, whose formula is $CH_2=CHCl$. The vinyl chloride polymer may be a copolymer (e.g., a copolymer of vinyl chloride and vinyl acetate). Polymers of vinyl chloride may be obtained, for instance, by suspension polymerisation or emulsion polymerization as known to the skilled person. A factor known as the K value is used to indicate the mean molecular weight of polyvinyl chloride. The K value is the viscosity of a 0.005 wt % solution of the polyvinyl chloride in cyclohexanone at 25° C. as measured using an Ubbelhode viscometer. The K value can be determined according to DIN EN ISO 1628-1 (1988).

According to a preferred embodiment of the present invention, polyvinyl chloride has a K value of at least 65, more preferably a K value from 68 to 72.

The plasticizing system contains at least one phthalate plasticizer and at least one second plasticizer.

The phthalate plasticizer is preferably selected from: di(2-ethylhexyl) phthalate (DEHP), diisononyl phthalate (DINP), diisodecyl phthalate (DIDP), diisotridecyl phthalate (DITP) and mixture thereof.

The second plasticizer is preferably selected from: dialkyl-adipate, dialkyl-sebacate or dialkyl-azelate, wherein the alkyl group contains from 6 to 10 carbon atoms, more preferably from 8 to 9 carbon atoms, and mixture thereof.

The plasticizing system is present in the first polymer composition in a total amount up to 45 phr (i.e. 45 parts per 100 parts by weight of PVC as polymer base material), preferably in an amount of from 30 phr to 45 phr, more preferably of from 35 phr to 45 phr.

Preferably, the phthalate plasticizer is present in the plasticizing system of the invention in an amount up to 50 wt % based on the total weight of the plasticizing system.

According to a particularly preferred embodiment, the weight ratio between the phthalate plasticizer and second plasticizer in the plasticizing system of the invention is about 1:2.

The first polymer composition of the present invention advantageously contains other additives. Preferably, the first polymer composition comprises a heat stabilizer which counters the effects of ageing; heat stabilizers also reduce the dehydrodehalogenation of PVC at the composition processing temperatures. Preferably, the heat stabilizer is selected from: zinc salt, calcium/zinc stabilizer, aluminum/magnesium/zinc stabilizer, organic phosphates, polyols and mixture thereof, zinc salt and calcium/zinc stabilizer being more preferred.

Preferably, the heat stabilizer is present in an amount of from 0.5 to 15 phr.

Other ingredients which may be added to the first polymer composition of the insulating layer include fillers, lubricants and pigments.

Fillers are incorporated in the formulations to reduce cost, increase the output of dry blending, increase electrical resistance, increase resistance to ultraviolet light, increase hardness, produce improved heat transmission, increase the resistance to heat deformation, and improve abrasion resistance. Fillers can also impart anti-blocking or anti-slip performance. Examples of suitable fillers include calcium carbonate, clays such as alumino-silicates, silica, dolomite, and bauxite. The particular particle size distribution and average surface area of the filler will be chosen according to the properties it is desired to impart. A preferred filler is calcium carbonate.

When used, the filler may be present in an amount up to 15 phr.

When a filler is present in the first polymer composition, the amount of plasticizing system should be lower than 45 phr.

Lubricants may be included to reduce the adhesion between PVC and hot machinery surfaces during processing. The lubricants also affect the factional properties between resin particles during processing. Examples of lubricants include stearic acid and metal stearates which can also act as stabilisers. Other lubricants that may be used include petroleum waxes, silicon oil, mineral oil, synthetic esters, and polyethylene waxes.

When used, the lubricants and processing aids may be present in a total amount up to 1-10 phr.

The first polymer composition of the invention may contain a flame retardant agent, though present the flame retardant features of the cable of the invention can be met by the inherent resistance to flame of the PVC polymer composition of the insulating layer in combination with the LS0H material of the outer sheath.

Flame retardant agents possibly present in the first polymer composition of the invention are halogen-free and antimony-free flame retardant agents. Examples of flame retardant agents that may be used include magnesium oxide or hydroxide both of synthetic and natural origin. A preferred flame retardant agent is natural magnesium hydroxide, also known as brucite. The flame retardant agent for the first polymer composition is optionally surface-treated with stearic acid or metal salt thereof.

When used, the flame retardant agent may be present in a total amount up to 10-20 phr.

The first polymer composition has a limiting oxygen index (LOI) up to 30%. Preferably, the first polymer composition of the insulating layer for the cable of the invention has a LOI of at least 20%.

The first polymer composition for producing the insulating layer can be prepared by mixing PVC and the other components according to methods known in the art, for example using an internal mixer (turbomixer), or continuous mixers of the Ko-Kneader (Buss) type or of the co-rotating or counter-rotating twin-screw type. The PVC composition can be extruded on a conductor so as to provide it with an insulating layer.

The halogen-free second polymer matrix of the second polymer composition for the outer sheath according to the present invention can be made of polymers selected, for example, from: polyethylene; polypropylene; polybutene; poly(4-methylpentene-1); ethylene copymers with $C_3$ to $C_8$ alpha-olefins such as ethylene-propylene copolymers, linear low density polyethylene (LLDPE) or the like; copolymers of $C_2$ to $C_8$ alpha-olefin/s and a diene; ethylene-acrylate copolymer; ethylene-vinyl acetate copolymers; ethylene-butyl acetate copolymers and mixtures thereof.

Examples of halogen-free second polymer matrix suitable for the outer sheath of the cable of the invention are described in WO 99/05688, WO 2000/19452 and EP 1043733.

As to the halogen-free inorganic flame-retardant filler present in the halogen-free second polymer matrix of the outer sheath, it may be generally selected from hydroxides, hydrated oxides, hydrated salts of metals, in particular of aluminium or magnesium, or mixtures thereof. Preferably, the halogen-free inorganic flame retardant filler is selected from magnesium hydroxide (either synthetic or natural), alumina trihydrate and mixture thereof.

Magnesium hydroxide is particularly preferred. Magnesium hydroxide of natural origin, obtained by grinding minerals based on magnesium hydroxide, such as brucite or the like, as described in WO 99/05688.

The halogen-free flame-retardant filler is generally used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like.

The halogen-free flame retardant filler is present in the second polymer composition in an amount suitable to impart flame retardant properties to the outer sheath. Preferably, the halogen-free flame retardant filler is present in a total amount of from 80 to 500 phr, more preferably form 120 to 300 phr.

In order to increase the compatibility with the polymer components, the second polymer composition may further comprises at least one coupling agent. Said coupling agent is preferably added to increase interaction between the active groups of the flame retardant filler and the polymer chains and therefore compatibility between the flame-retardant filler and the polymer components. According to a preferred embodiment, the at least one flame retardant filler can be surface-treated with the coupling agent.

The coupling agent can be selected from those known in the art, for example: saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

The coupling agent can be added to the second polymer composition as such or pregrafted onto a polyolefin, for example polyethylene or copolymers of ethylene with an alpha-olefin, by means of a radical reaction (see for example patent EP 530940). The amount of the coupling agent grafted may be of from 0.05 to 5 parts by weight, preferably from 0.1 to 2 parts by weight, relative to 100 parts by weight of polyolefin.

Other conventional components such as antioxidants, processing coadjuvants, lubricants, pigments and the like can be added to the second polymer compositions of the outer sheath.

Other compounds which may be used in the second polymer composition of the outer sheath include, for example, glass particles, glass fibres, calcined kaolin, talc and the like, or mixtures thereof. Processing co-adjuvants can also be present, such as for example, calcium stearate, zinc stearate, stearic acid, paraffin wax, silicone rubbers and the like, or mixtures thereof.

The second polymer composition to produce the outer sheath according to the present invention can be prepared by mixing the halogen-free second polymer matrix, the halogen-free inorganic flame retardant, and the optional additives according to methods known in the art. The mixing can be carried out, for example, using an internal mixer of the type with tangential rotors (Banbury) or with interpenetrating rotors, or alternatively in continuous mixers such as those of the type Ko-Kneader (Buss), or of the type co-rotating or counter-rotating twin-screw. The second polymer composition is preferably used in non-crosslinked form, to obtain a coating with thermoplastic properties. It is also possible to carry out a partial crosslinking of the polymer matrix according to methods known in the art.

Advantageously, the second polymer composition for the outer sheath of the cable of the invention has a LOI greater than that of the first polymer composition for the insulating layer. Preferably, the second polymer composition has a LOI greater than 35%. Preferably, the second polymer composition has a LOI lower than 70%, more preferably lower than 60%.

BRIEF DESCRIPTION OF THE DRAWINGS

Further characteristics will be apparent from the detailed description given hereinafter with reference to the accompanying drawings, in which.

DETAILED DESCRIPTION OF THE PREFERRED EMBODIMENTS

Figure 1:
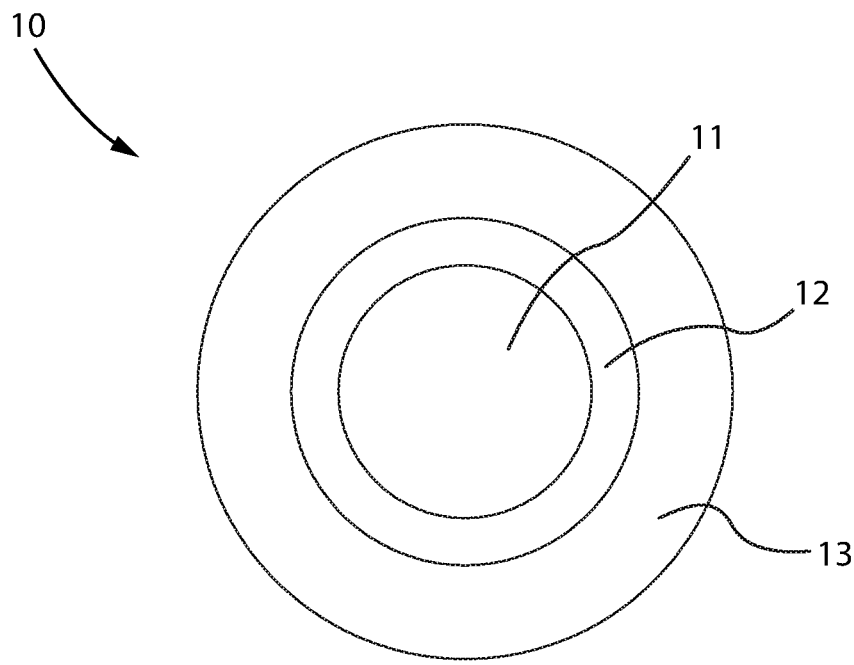
FIG. 1 is a cross section view of a unipolar cable according to the invention for power transmission at low voltage.

With reference to FIG. 1, the electric cable 10 is of the unipolar type comprising a single conductor 11 covered by and in direct contact with an electrically insulating layer 12. The insulating layer 12 is encircled by and in direct contact with an outer sheath 13. The insulating layer 12 and the outer sheath 13 are made of a PVC based first polymer composition and of a second polymer composition according to the present invention, respectively. The conductor 1 can be in form of a solid rod or of bundled wires made of electrically conductive metal such as copper or aluminum or composite thereof.

Figure 2:
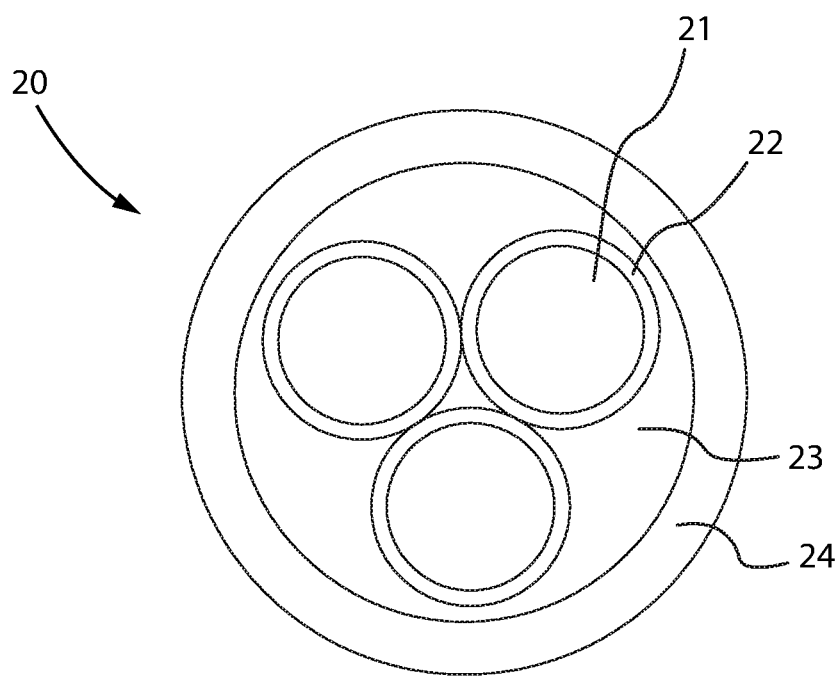
FIG. 2 shows a cross section view of a tripolar cable according to the invention for telecommunication.

With reference to FIG. 2, the electric cable 20 according to the present invention may be of the tripolar type comprising three electrically conducting elements or conductors 21 each covered by and in direct contact with an electrically insulating layer 22. The three conductors 21 with the relevant insulating layers 22 are encircled by an outer sheath 24. The three coated conductors 1 are stranded together forming interstitial zones defined as the spaces between the coated conductors and the outer sheath 24) enveloping them.

A bedding or interstitial filler 23 fills said interstitial zones. The bedding 23 can be made of a thermoplastic like material, for example polyethylene, preferably added with a zero-halogen flame-retardant filler like magnesium hydroxide in an amount, for example, of from 50 phr to 200 phr.

In an alternative embodiment, the cable 20 may comprise two or four conductors 21.

Both the cable 10 and 20 of FIGS. 1 and 2, respectively, may further comprise a mica tape layer interposed between each of the conductor 11 and 21 and the respective insulating layer 12 and 22.

Both the cable 10 and 20 of FIGS. 1 and 2, respectively, may further comprise an armour surrounding the outer sheath 13 and 24. The armour can be made of metal wires, for example steel wires, preferably galvanized. In turn, the armour may be surrounded by a polymeric jacket, preferably made of a LS0H polymeric composition. A tape, for example a polyester tape, is advantageously interposed between the armour and the polymeric jacket.

The cable 20 of FIG. 2 may further comprise a central strength element around which the conductors 22 are stranded, said central element being made of, for example, polyethylene, preferably added with a zero-halogen flame-retardant filler like magnesium hydroxide in an amount, for example, of from 50 phr to 200 phr.

The present description shows only some embodiments of a cable according to the invention. Suitable modifications can be made to these embodiments according to specific technical needs and application requirements without departing from the scope of the invention.

The following examples are provided to further illustrate the invention.

Preparation of the First Polymer Composition (Insulating Layer)

The first polymer compositions of the examples reported in Table 1 were prepared in a closed turbomixer (volume of the mixing chamber: 3000 $cm^3$). The amounts are reported as phr (parts by weight with respect to 100 parts by weight of the PVC polymer). PVC and stabilizer, in form of powder, were added in the turbomixer and thoroughly mixed very well. Then plasticizers and the other mixture components were added and the composition mixed to 180° C.

The examples marked by the asterisk (*) are the comparative ones.

The compositions of Examples 1-9 of Table 1 were printed in form of plaques by printing at 180° C. using a mechanical press and then tested.

Electric cables were prepared using the compositions of examples 1-9 as insulating layers of tripolar cables (as the cable of FIG. 2) wherein each cable conductor was 2.5 $mm^2$. The outer sheath of each tested cable was made of a second polymer composition comprising LLDPE as second polymer matrix and 230 phr of magnesium hydroxide as flame-retardant filler. Each sample of electric cable tested was 60 m long.

A number of properties were evaluated both on the plaques and the cables and the results are set forth in Table 2.

TABLE 1

| Composition of samples | | | | | | | |
|---|---|---|---|---|---|---|---|
| | 1 | 2 | 3 | 4 | 5 | 6* | 7* |
| PVC[a] (polymer matrix) | 100 | 100 | 100 | 100 | 100 | 100 | 100 |
| DIDP[b] (phthalate plasticizer) | 12.5 | 12.5 | 12.5 | 12.5 | 20.0 | 17.0 | 12.5 |
| Dioctyl adipate (second plasticizer) | — | 25.0 | — | — | — | — | — |
| Bis(2-ethylhexyl) azelate (second plasticizer) | 25.0 | — | 25.0 | 30.0 | 25.0 | 30.0 | 30.0 |
| Epoxidized soya bean oil (plasticizer) | — | — | — | — | — | — | 2.7 |
| Chalk (CaCO$_3$) (filler) | — | — | 13.0 | 13.0 | — | 13.0 | 13.0 |
| Mg(OH)$_2$ (stearic acid coated) | 13.0 | 13.0 | — | — | 13.0 | — | — |
| Ca/Zn (heat | 3.5 | 3.5 | 3.5 | 3.5 | 3.5 | 3.5 | 3.5 |

TABLE 1-continued

Composition of samples

| | 1 | 2 | 3 | 4 | 5 | 6* | 7* |
|---|---|---|---|---|---|---|---|
| stabilizer) | | | | | | | |
| Total amount of plasticizers | 37.5 | 37.5 | 37.5 | 42.5 | 45.0 | 47.0 | 45.25 |

(a)K value: 70
(b)DIDP: diisodecyl phthalate

TABLE 2

| Measured properties of samples | | | | | | | |
|---|---|---|---|---|---|---|---|
| | 1 | 2 | 3 | 4 | 5 | 6* | 7* |
| Volume resistivity (on plaque) (ohm · cm) | $2.98 \times 10^{13}$ | — | $0.8 \times 10^{13}$ | $0.68 \times 10^{13}$ | $0.54 \times 10^{13}$ | $0.33 \times 10^{13}$ | $0.30 \times 10^{13}$ |
| Volume resistivity (on cable) (ohm · cm) | $2.98 \times 10^{13}$ | $1.71 \times 10^{13}$ | $1.65 \times 10^{13}$ | $1.15 \times 10^{13}$ | $1.16 \times 10^{13}$ | — | — |
| Limiting Oxygen Index | 25 | 25 | 24 | 24 | 24 | — | 22 |
| Bending Test at −52° C./4 hours (IEC 60811-504, 2012) | Positive (no cracks) | Positive (no cracks) | — | — | — | — | — |
| Impact Test at −52° C./4 hours (IEC 60811-506, 2012) | Positive (no cracks) | Positive (no cracks) | — | — | — | — | — |
| Elongation Test at −52° C./ 4 hours (IEC 60811-505, 2012) | 84.5% | 81% | — | — | — | — | — |

The volume resistivity was measured according to IEC 60502-1 (2004).

The mechanical tests at −52° C. and the smoke density test were performed on cables. The experimental data show that the compositions 1-5 according to the invention had a volume resistivity equal to or higher than $1 \times 10^{13}$, fulfilling the requirement for insulating layer according to IEC 60502-1 (2004). On the contrary, comparative compositions 6 and 7 had a very low volume resistivity. Without wishing to be bound to any theory, the unacceptable volume resistivity of comparative composition 6 could be due to an excessive amount of plasticizing system (47 phr) and the unacceptable volume resistivity of comparative composition 6 could be due to the presence of epoxidized soya bean oil in the plasticizing system.

The cables comprising an insulating layer according to the invention (compositions 1 and 2) maintained adequate mechanical properties at temperatures of −50° C. or lower.

The invention claimed is:

1. An electric cable comprising:
an electric conductor surrounded with an electrically insulating layer of a first polymer composition comprising:
(a) polyvinyl chloride as a polymer matrix,
(b) an amount up to 45 phr of a plasticizing system consisting of a phthalate plasticizer and a second plasticizer selected from: dialkyl-adipate, dialkyl-sebacate or dialkyl-azelate, wherein the alkyl group contains from 4 to 10 carbon atoms;
the first polymer composition having a limiting oxygen index (LOI) up to 30%; and
an outer sheath, surrounding the insulating layer, made from a second polymer composition comprising:
(i) a halogen-free polymer matrix; and
(ii) a halogen-free inorganic flame-retardant filler in amount suitable to impart flame retardant properties to the outer sheath.

2. The cable according to claim 1 wherein the phthalate plasticizer is selected from the group consisting of di(2-ethylhexyl) phthalate (DEHP), diisononyl phthalate (DINP), diisodecyl phthalate (DIDP), diisotridecyl phthalate (DITP) and a mixture thereof.

3. The cable according to claim 1, wherein the alkyl group of the second plasticizer contains from 6 to 10 carbon atoms.

4. The cable according to claim 1 wherein the plasticizing system is present in the first polymer composition in a total amount of from 30 phr to 45 phr.

5. The cable according to claim 1 wherein the first polymer composition further comprises a halogen-free and antimony-free flame retardant agent.

6. The cable according to claim 1 wherein the polyvinyl chloride (a) has a K value of at least 65 or higher.

7. The cable according to claim 1 wherein the first polymer composition further comprises a heat stabilizer.

8. The cable according to claim 7 wherein the heat stabilizer is selected from the group consisting of a zinc salt a calcium/zinc stabilizer and a mixture thereof.

9. The cable according to claim 1 wherein the insulating layer has a LOI of at least 20%.

10. The electrical cable according to claim 1, wherein the halogen-free flame-retardant filler of the second polymer composition is selected from the group consisting of magnesium hydroxide, aluminum trihydrate and mixtures thereof.

11. The electrical cable according to claim 1 wherein the halogen-free flame retardant filler is present in a total amount of from 80 to 500 phr.

12. The cable according to claim 1 wherein the second polymer composition comprises a polymer selected from the group consisting of polyethylene; polypropylene; polybutene; poly(4-methylpentene-1); ethylene copolymers with $C_3$ to $C_8$ alpha-olefins; copolymers of $C_2$ to $C_8$ alpha-olefin/s and a diene; ethylene-acrylate copolymer; ethylene-vinyl acetate copolymers; ethylene-butyl acetate copolymers and mixtures thereof.

13. The cable according to claim 1 wherein the second polymer composition of the outer sheath has a LOI greater than that of the first polymer composition of the insulating layer.

14. The cable according to claim 1 wherein the second polymer composition has a LOI greater than 35%.

15. The cable according to claim 1 wherein the second polymer composition has a LOI lower than 70%.

16. The electrical cable according to claim 1 wherein the halogen-free flame retardant filler is present in a total amount of from 120 to 300 phr.

* * * * *